(12) United States Patent
Riegger et al.

(10) Patent No.: US 6,537,045 B2
(45) Date of Patent: Mar. 25, 2003

(54) ROTATING MACHINE HAVING LUBRICANT-CONTAINING RECESSES ON A BEARING SURFACE

(75) Inventors: Otto K. Riegger, Ann Arbor, MI (US); Robert B. Weatherwax, III, Ann Arbor, MI (US); John S. Kosco, Tecumseh, MI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/898,122

(22) Filed: Jul. 3, 2001

(65) Prior Publication Data

US 2002/0021976 A1 Feb. 21, 2002

Related U.S. Application Data

(60) Provisional application No. 60/216,044, filed on Jul. 5, 2000.

(51) Int. Cl.[7] .................................................. F03C 2/00
(52) U.S. Cl. ............................ 418/63; 418/1; 418/76; 418/81; 184/6.16
(58) Field of Search ............................... 418/63, 81, 1, 418/76; 184/6.16

(56) References Cited

U.S. PATENT DOCUMENTS

| | | | |
|---|---|---|---|
| 824,628 A | 6/1906 | Curtis | |
| 1,496,809 A | 6/1924 | Johnson | |
| 2,266,377 A | 12/1941 | Neely et al. | |
| 2,373,871 A | 4/1945 | Connor et al. | |
| 2,431,430 A | 11/1947 | Shaw | |
| 2,883,101 A | * 4/1959 | Kosfeld | ............ 184/6.16 |
| 2,916,334 A | 12/1959 | Thoma | |
| 2,980,473 A | 4/1961 | Tanis | |
| 3,575,264 A | 4/1971 | Johnson | |
| 3,635,535 A | 1/1972 | Schultenkamper | |
| RE27,651 E | 5/1973 | Artzer et al. | |
| 3,813,193 A | * 5/1974 | Rinehart | ............ 418/63 |
| 4,065,279 A | 12/1977 | McCullough | |
| 4,383,771 A | 5/1983 | Freytag et al. | |
| 4,629,403 A | * 12/1986 | Wood | ............ 418/63 |
| 4,637,786 A | 1/1987 | Matoba et al. | |
| 4,677,950 A | 7/1987 | Buske | |
| 4,704,076 A | 11/1987 | Kawaguchi et al. | |
| 4,710,111 A | * 12/1987 | Kubo | ............ 184/6.16 |
| 4,772,188 A | 9/1988 | Kimura et al. | |
| 4,826,396 A | 5/1989 | Blount | |

(List continued on next page.)

FOREIGN PATENT DOCUMENTS

| | | | | |
|---|---|---|---|---|
| JP | 01-203692 | * | 8/1989 | ............ 418/76 |
| JP | 06-074170 | * | 3/1994 | ............ 418/98 |

Primary Examiner—Thomas Denion
Assistant Examiner—Theresa Trieu
(74) Attorney, Agent, or Firm—Baker & Daniels

(57) ABSTRACT

A rotating type machine including a first moving member having a first surface and a second member having a second surface slidably interfacing with the first surface. The first and second surfaces have relative movement therebetween, and one of the first and second members is supported by the other member through the interface of their respective first and second surfaces. At least one of the first and second surfaces is provided with at least one recess therein. A liquid lubricant is provided between the first and second surfaces, and the lubricant is received in the recess. Relative to the surface in which the recess is provided, the recess has a maximum depth which ranges between about 0.00125 and 0.0060 inches, and a surface area which ranges between about $1.767 \times 10^{-4}$ and $1.963 \times 10^{-3}$ square inches, whereby, during operation of the machine, a pressure spike is created in the lubricant above the recess, and first and second surfaces are hydrodynamically separated from each other by the pressure spike.

23 Claims, 10 Drawing Sheets

U.S. PATENT DOCUMENTS

| | | |
|---|---|---|
| 4,875,838 A | 10/1989 | Richardson, Jr. |
| 5,137,418 A | 8/1992 | Sieghartner |
| 5,160,247 A | 11/1992 | Kandpal |
| 5,346,376 A | 9/1994 | Bookbinder et al. |
| 5,363,557 A | 11/1994 | Thompson et al. |
| 5,413,469 A | 5/1995 | Nakajima et al. |
| 5,478,223 A | 12/1995 | Yamamoto et al. |
| 5,554,015 A | 9/1996 | Dreiman et al. |
| 5,626,470 A | 5/1997 | Gerhardt |
| 5,667,372 A * | 9/1997 | Hwang et al. ............ 418/63 |
| 5,722,776 A | 3/1998 | White |
| 5,810,479 A | 9/1998 | Miyasaka et al. |
| 5,829,960 A | 11/1998 | Dreiman |

* cited by examiner

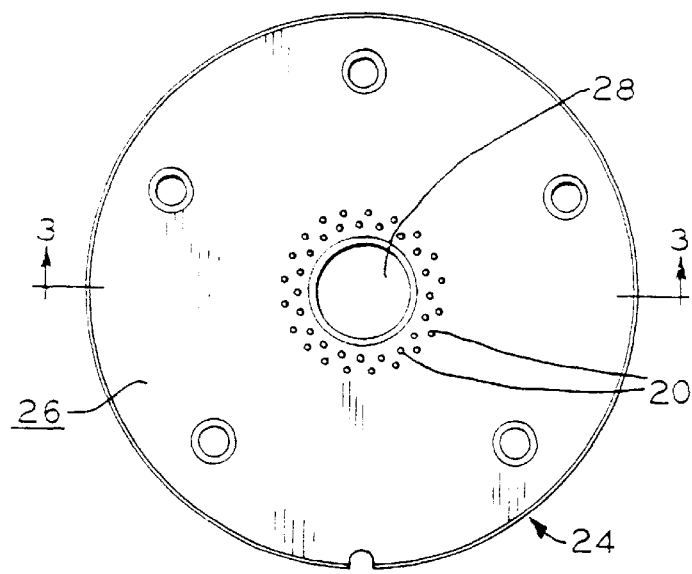
FIG_2
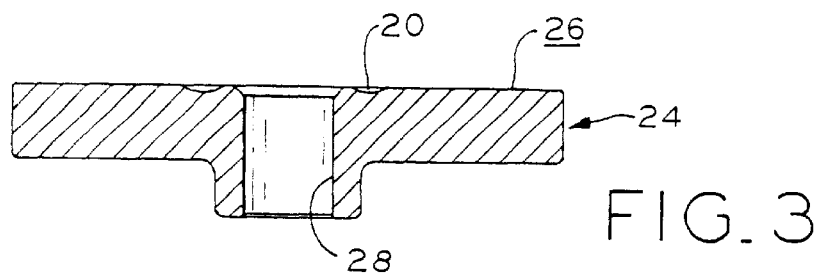
FIG_3
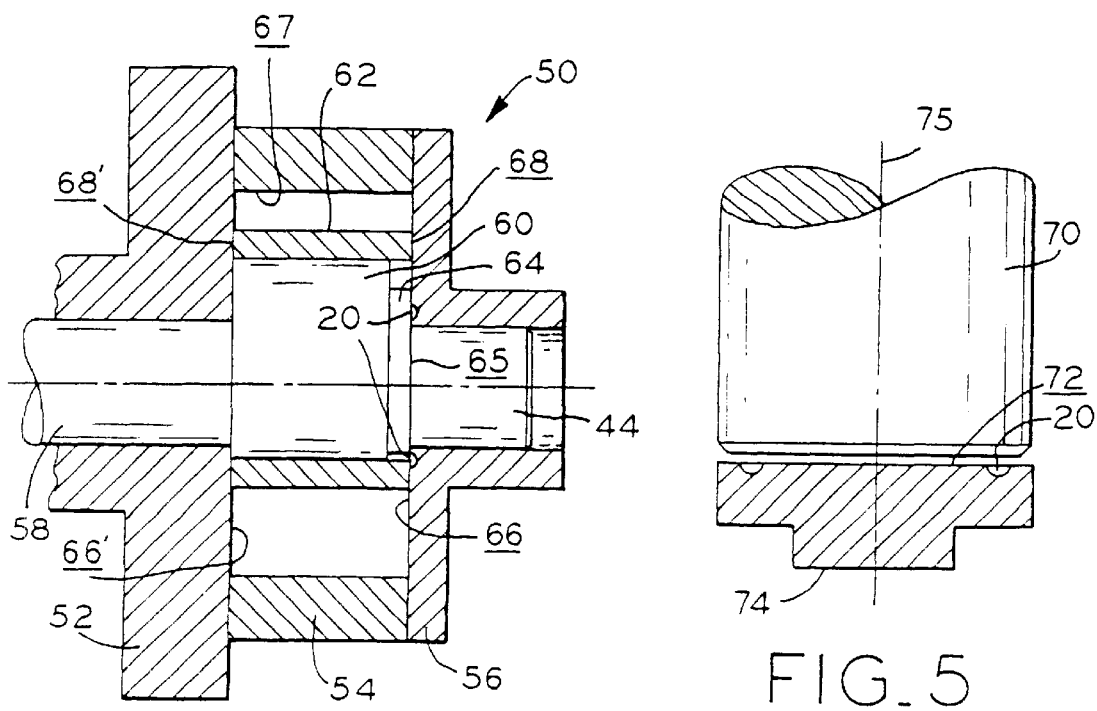
FIG_4
FIG_5

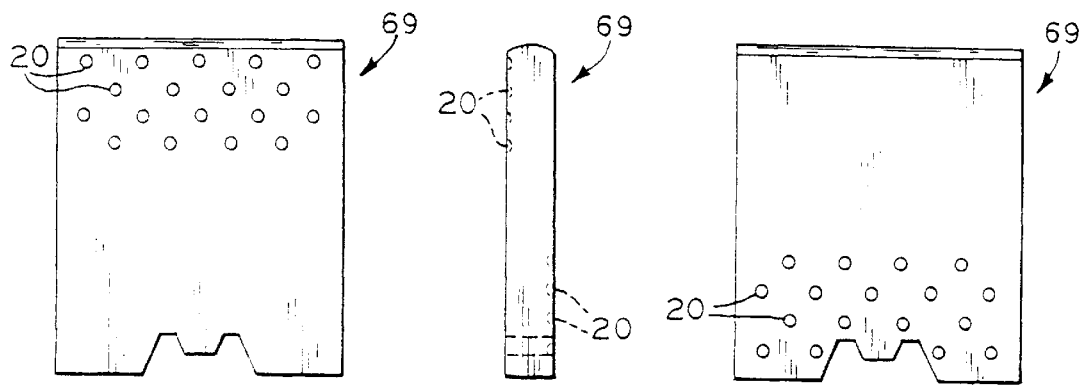
FIG_9A  FIG_9B  FIG_9C
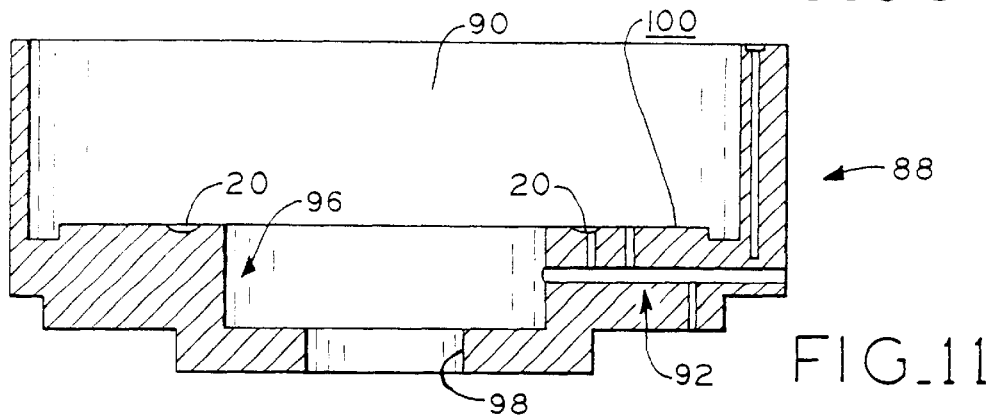
FIG_11
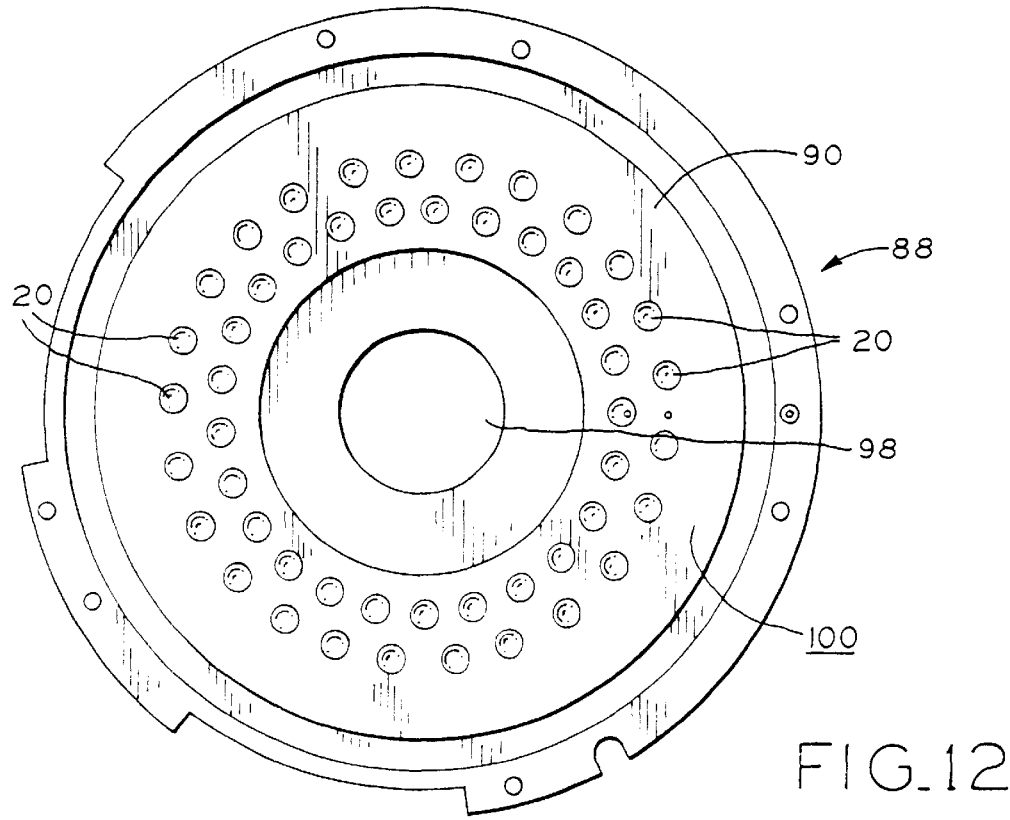
FIG_12

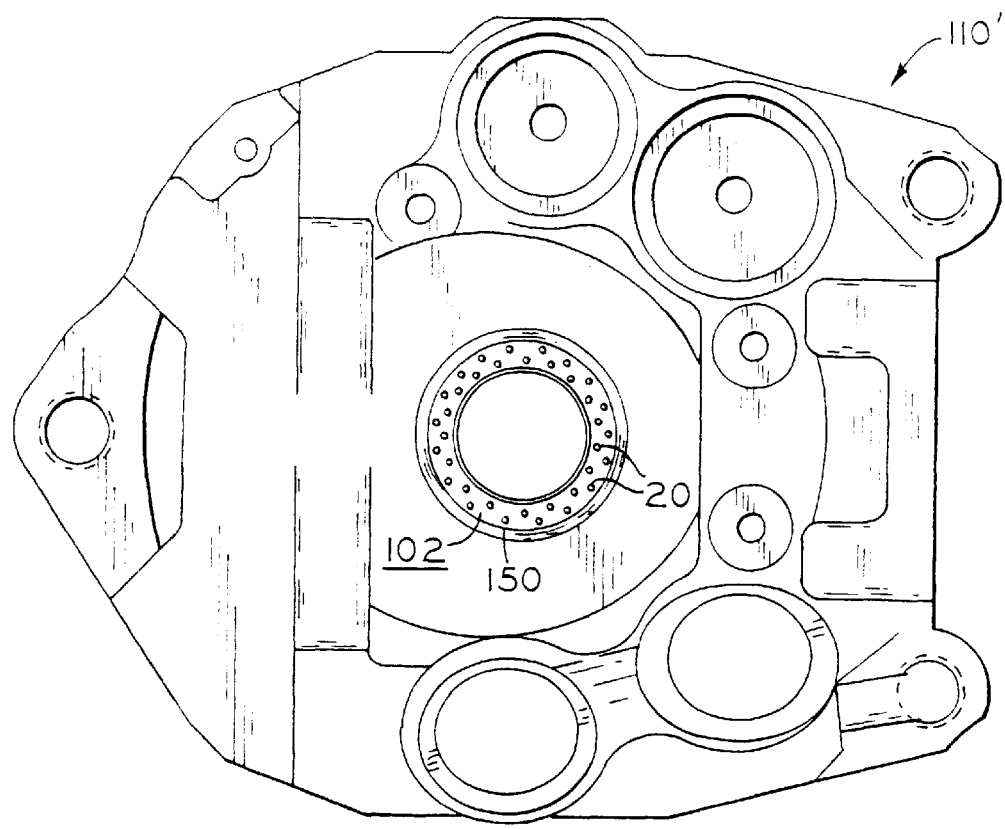
FIG_18
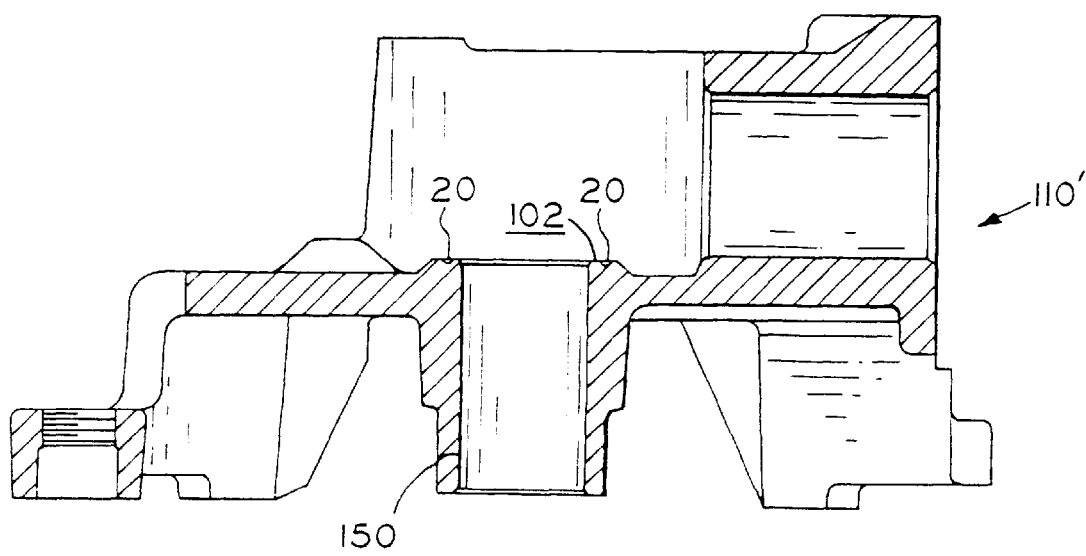
FIG_17

ROTATING MACHINE HAVING
LUBRICANT-CONTAINING RECESSES ON A
BEARING SURFACE

CROSS REFERENCE TO RELATED APPLICATIONS

This application claims the benefit under Title 35, U.S.C. §119(e) of U.S. Provisional Patent Application Serial No. 60/216,044, entitled ROTATING MACHINE HAVING LUBRICANT-CONTAINING RECESSES ON A BEARING SURFACE, filed on Jul. 5, 2000.

BACKGROUND OF THE INVENTION

The present invention relates to rotating type machines including, but not limited to compressors, pumps, transmissions and engines, and particularly to lubricated radial or thrust bearings therein.

Rotating machines in general have mating axially or radially loaded surfaces such as those at a thrust bearing or radial bearing, respectively, in a compressor. These surfaces tend to be a location of high wear and usually require lubrication. Lubrication between the interfacing bearing surfaces is often facilitated by providing oil to recesses, a groove or clearance space (collectively, recesses) located between these surfaces for retaining oil. Another means of providing an oil retention space between interfacing bearing surfaces is to apply a phosphate coating to one or both of these surfaces, the coating forming micron-sized interstices in which oil is retained. Oil passed over the interfacing bearing surfaces creates a film of lubricant therebetween, which supports the bearing load and reduces the amount of friction, and thus the amount of wear, between the bearing surfaces. The provision of oil retention spaces between the bearing surfaces is intended to help facilitate the formation of this film.

Previous attempts at using recesses for retaining oil between the interfacing bearing surfaces have yielded unsatisfactory results. These recesses were formed having depths on the order of tens of thousands of an inch, and are believed to be too deep for providing a sufficient lubricant film between bearing surfaces. Lubricant captured in these recesses cannot be easily drawn out to lubricate the bearing and establish an oil film to hydrodynamically support the load. Conversely, if the recesses are too small or nonexistent an insufficient amount of lubricant may be received therein to establish the film or a film sufficient to support the bearing load and lubricate the bearing interface. Such a lack of lubricant allows the bearing load to overcome the hydrodynamic pressure provided by the inadequate film, and the oil is forced from between the interfacing bearing surfaces, allowing contact thereof.

Although the interstices formed in phosphate coatings may allow for adequate oil retention and establishment of the oil film between the bearing surfaces, these coatings do not adhere well to aluminum or powdered metal parts which are common bearing components in rotary machines. Further, during the process of applying the phosphate coating, it may undesirably interface with other parts, causing problems with the operation of the device.

A means for retaining oil between the interfacing bearing surfaces which is more effective than previously provided, and/or which avoids the problems mentioned hereinabove is desired.

SUMMARY OF THE INVENTION

The present invention provides a rotating type machine including a first moving member having a first surface and a second member having a second surface slidably interfacing with the first surface. The first and second surfaces have relative movement therebetween, and one of the first and second members is supported by the other member through the interface of their respective first and second surfaces. At least one of the first and second surfaces is provided with at least one recess therein. A liquid lubricant is provided between the first and second surfaces, and the lubricant is received in the recess. Relative to the surface in which the recess is provided, the recess has a typical depth of 0.002 inches but which may range between about 0.00125 and 0.0060 inches, and an area at the surface which ranges between about $1.767 \times 10^{-4}$ and $1.963 \times 10^{-3}$ square inches, whereby, during operation of the machine, a pressure spike is created in the lubricant above the recess, and first and second surfaces are hydrodynamically separated from each other by the pressure spike.

The present invention also provides a rotating machine including a rotating element, a sliding member having first and second surfaces, the rotating element engaging the sliding member and inducing a moment thereon, and a slotted member having third and fourth surfaces slidably interfacing with and moving relative to the first and second surfaces, respectively. At least one of the surfaces is provided with at least one recess therein, and liquid lubricant is provided between the interfacing surfaces, the lubricant being received in the recess. Relative to the surface in which the recess is provided, the recess has a maximum depth which ranges between about 0.00125 and 0.0060 inches, and a surface area which ranges between about $1.767 \times 10^{-4}$ and $1.963 \times 10^{-3}$ square inches, whereby, during operation of the machine, a pressure spike is created in the lubricant above the recess, the interfacing surfaces are hydrodynamically separated from each other by the pressure spike, and the moment is at least partially counteracted by the spike.

The present invention further provides a method of elastohydrodynamically separating a pair of slidably interfacing surfaces including: slidably interfacing a first member having a first surface and a second member having a second surface; relatively moving the first and second surfaces; collecting a quantity of lubricant in a recess located in one of the first and second surfaces; creating a pressure spike in the lubricant above the recess and between the first and second surfaces; and elastohydrodynamically separating the first and second surfaces with the pressure spike.

The rotating machine may be, but is not limited to, a compressor, pump, transmission or engine. The dimples or recesses may be, for example, spherically shaped, but other shapes (e.g., cylindrical, parallelepiped) may be employed provided that the depth of the recess and its area at the surface in which it is located are suitably selected in accordance with the present invention. The prescribed size and depth of the dimple produces, in the oil above the dimple, a pressure spike which supports the bearing load; the oil also lubricates the interfacing bearing surfaces.

In accordance with the present invention, the oil-receiving recesses or dimples may be incorporated into either thrust type bearings, radial type bearings, or planar sliding surfaces to reduce wear of the surfaces, thereby increasing the life of the parts and efficiency of the machine.

BRIEF DESCRIPTION OF THE DRAWINGS

The above mentioned and other features and objects of this invention, and the manner of attaining them, will become more apparent, and the invention itself will be better understood, by reference to the following description of embodiments of the invention taken in conjunction with the accompanying drawings, wherein:

FIG. 2 is a plan view of the outboard bearing of the rotary compressor of FIG. 1;

FIG. 3 is a sectional view of the outboard bearing of FIG. 2 along line 3—3 thereof;

FIG. 4 is a fragmentary sectional view of a second embodiment of rotary compressor in accordance with the present invention;

FIG. 5 is a sectional view of another embodiment of a thrust bearing according to the present invention, also showing the end of a rotating shaft abutting same;

FIG. 9A is a plan view of a first side of the vane of the compressor of FIG. 6;

FIG. 9B is a side view of the vane of FIG. 9A;

FIG. 9C is a plan view of the second side of the vane of FIG. 9A;

FIG. 11 is a sectional side view of the frame of the scroll compressor of FIG. 10;

FIG. 12 is a plan view of the frame of FIG. 11;

FIG. 17 is a sectional side view of the crankcase of the reciprocating piston compressor of FIG. 16;

FIG. 18 is a plan view of the crankcase of FIG. 17;

Figure 1:
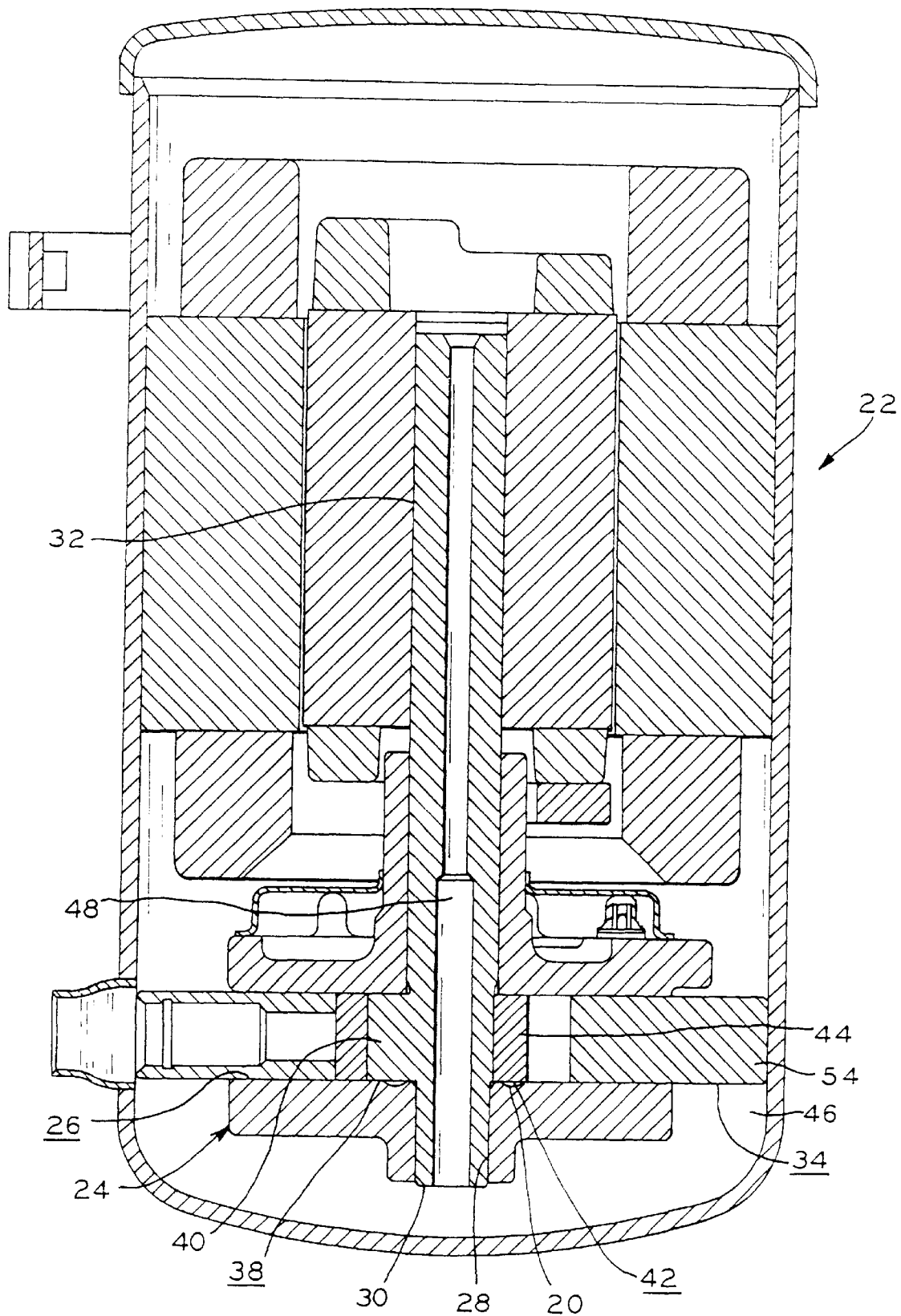
FIG. 1 is a longitudinal sectional view of a first embodiment of a rotary compressor in accordance with the present invention.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE INVENTION

In accordance with the present invention, radial bearing, thrust bearing and planar sliding surfaces of the depicted machines are provided with recesses or dimples 20 which facilitate increased elastohydrodynamic separation forces between, and lubrication of, the interfacing bearing surfaces. Oil received between the bearing surfaces is captured within dimples 20, and above each of the dimples, a pressure spike is created in the oil which acts on the interfacing bearing surfaces, ensuring separation and sufficiently reducing wear of the surfaces. Dimple 20 may be machined into its bearing surface, depressed into its bearing surface, or otherwise integrally formed into its bearing surface.

Dimples 20 may be applied to bearing surfaces in several types of rotating machines, such as hermetically sealed rotary compressor 22 shown in FIG. 1. Rotary compressor 22 includes thrust or outboard bearing 24 having dimples 20 on thrust surface 26 thereof. The general concept of a rotary compressor is disclosed, for example, in U.S. Pat. Nos. 5,829,960 to Dreiman, 6,171,076 to Gannaway, and 6,195,889 to Gannaway, the disclosures of which are expressly incorporated herein by reference. With reference to FIGS. 2 and 3, outboard bearing 24 has bore 28 therethrough for receiving end 30 of crankshaft 32, and surface 26 which is in contact with lower surface 34 of cylinder block 54. Surface 26 of outboard bearing 24 is also in contact with surface 38 of eccentric 40, integrally formed in crankshaft 32, and annular surface 42 of roller piston 44 which surrounds the crankshaft eccentric. Oil is provided to surface 26 in any conventional way for lubrication and/or sealing of eccentric surface 38 and piston surface 42 relative to surface 26. Formed in surface 26 about bore 28 are dimples 20. As depicted, a pair of individual concentric annular arrays of dimples 20 surround bore 28 in an equally distributed manner. Notably, the dimples of one array are located circumferentially between a pair of circumferentially adjacent dimples of the other array. It is to be understood, however that the number of dimple arrays, whether one, two (as shown), or more, may be varied to accommodate different loads exerted on surface 26. The oil in each of dimples 20 creates a pressure spike which elastohydrodynamically supports the load exerted on surface 26 by the crankshaft or the piston. The more dimples within each array, or the more arrays, the more pressure spikes are created and thus the greater the load which can be accommodated. By thus separating eccentric 40, piston 44 and outboard bearing 24, wear of surfaces 26, 38 and 42, indeed their direct contact during compressor operation, is nearly eliminated and the efficiency of compressor 22 is increased. Notably, dimples 20 may be located on either or both of the interfacing bearing surfaces, but dimples 20 are preferably located on the non-rotating surface.

A second embodiment of a rotary compressor according to the present invention is shown in FIG. 4. Rotary compressor 50 includes main bearing 52, cylinder block 54, and thrust or outboard bearing 56. Crankshaft 58 is rotatably supported in main bearing 52 and has eccentric 60 located within cylinder block 54. Roller piston 62 is disposed about eccentric 60. Compressor 50 may be otherwise substantially similar to compressor 22, but its crankshaft 58 is provided with shoulder 64 having axial surface 65 which is in axially abutting engagement with thrust surface 66 of outboard bearing 56. Oil in dimples 20 provides elastohydrodynamic lubrication and thrust support to crankshaft 58 through shoulder 64. Annular axial surface 68 of piston 62 also slidably abuts surface 66. Dimples 20 are provided in thrust surface 66 of outboard bearing 56 and form an annular array as described above with respect to compressor 22. During operation of rotary compressor 50, however, dimples 20 are cyclically covered and uncovered by the respective interfacing axial surfaces 65 and 68 of shoulder 64 and piston 62. Although it is possible to configure these thrust bearings such that the array(s) of dimples is wholly covered by the surface which interfaces the surface in which the dimples are provided, as shown in FIG. 4, shoulder surface 65 covers approximately half of dimples 20 in an array, and oil may be received in dimples 20 while uncovered.

Referring now to FIG. 5, there is shown another embodiment of a thrust bearing according to the present invention. Thrust bearing 74, which may also be adapted for use in hermetic compressors, is provided with an annular array of dimples 20, as described above, and the end of shaft 70 interfaces and rotates in place relative to surface 72, in which the dimples are located. As described above, the relative motion of shaft 70 and surface 72 causes the oil in each of dimples 20 to create a pressure spike, and shaft 70 is axially supported elastohydrodynamically on the film of oil. Notably, longitudinal axis 75 of shaft 70 and the annular array of dimples 20 are concentric.

Figure 6:
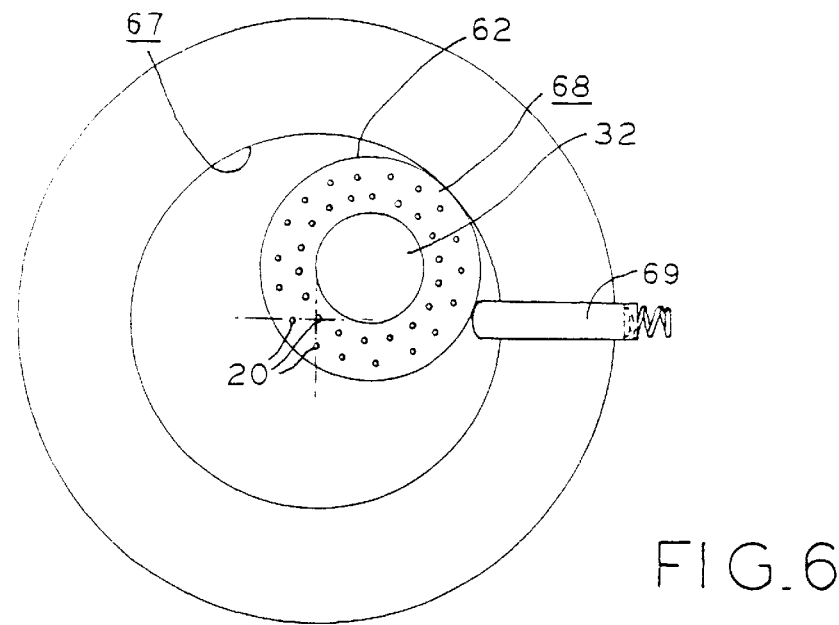
FIG. 6 is a sectional view of the compression chamber in the rotary compressor of FIG. 1.

Referring now to FIG. 6, there is shown the roller and vane of the compression chamber of a rotary compressor. First and second annular axial surfaces 68, and 68' of eccentric roller 62 (FIGS. 7A–7C), driven by crankshaft 32, seal against compression chamber surfaces 66 and 66'. Eccentric roller 62 also engages cylindrical compression chamber surface 67 at a discrete movable line on its outer periphery. Vane 69 maintains contact with roller 62 in the usual, known manner, thereby creating a pressurized zone within the compression chamber.

Figures 7A, 7B, 7C:
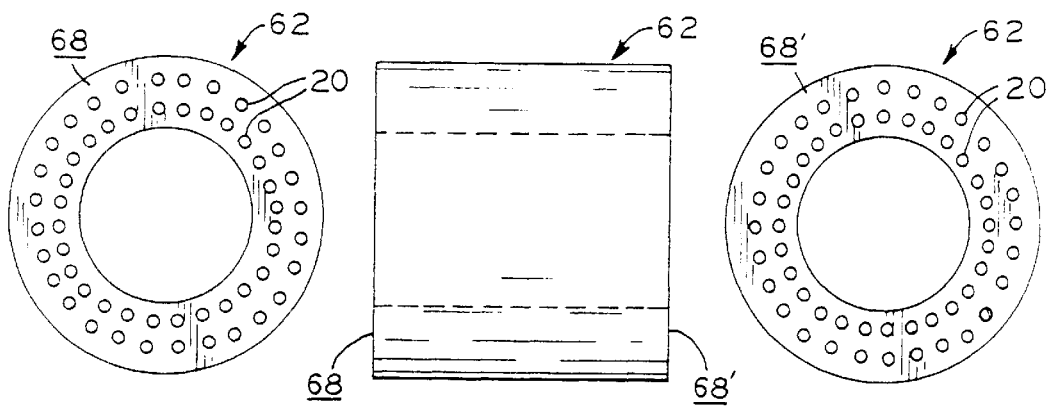
FIG. 7A is a view of a first side of the roller of the compressor of FIG. 1.
FIG. 7B is an end view of the roller of FIG. 7A.
FIG. 7C is a view of the second end surface of the roller of FIG. 7A.

Referring now to FIGS. 7A, 7B, and 7C, there is shown roller 62 of FIGS. 4 and 6 in accordance with the present invention. The roller ends 68, and 68' are provided with an annular array of dimples 20, as described above. The compression chambers annular axial surface 66, 66' and roller ends 68, 68' slidably interface and rotate relative one another. As described above, the relative motion of roller ends 68, 68' and the compression chambers annular axial surfaces 66 and 66', cause the oil in each of dimples 20 to create a pressure spike. The roller ends are prevented from contacting the compression walls by the hydrodynamic force created by the pressure spike resulting in less wear of the surfaces and greater efficiency of the compressor.

Figure 8:
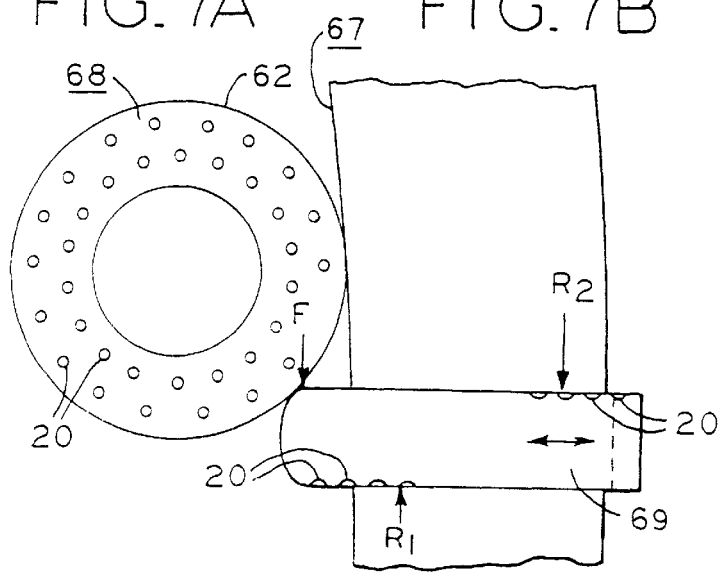
FIG. 8 is a an enlarged fragmentary view of the compressor of FIG. 6 showing the forces acting upon the vane.

Referring now to FIG. 8, there is shown vane 69 of FIGS. 4 and 6. The vane maintains contact with roller 62, which rotates within the compression chamber, as described above. The contact between the roller and the vane creates force F, acting upon the vane tangential to the direction of roller rotation which induces a moment on the vane. This creates reactionary force R1 on the vane at the end of the vane entering the compression cylinder, on the opposite surface that the force was applied, and a reactionary force R2 on the vane, at the end of the vane which remains within the vane slot of the compression chamber. Referring to FIGS. 9A, 9B and 9C, each of the vane load sites, located on opposite planar sides of the vane and near opposite ends of the vane, are supplied with dimples 20. As described above, the relative motion of the vane and the slot walls cause the oil in each of dimples 20 to create a pressure spike. The vane load sites are prevented from contacting the slot walls by the hydrodynamic force created by the pressure spike resulting in less wear of the surfaces and greater efficiency of the compressor. The spikes formed on the opposite sides of the vane form reactionary forces R1 and R2 which counteract the moment induced by force F.

Figure 10:
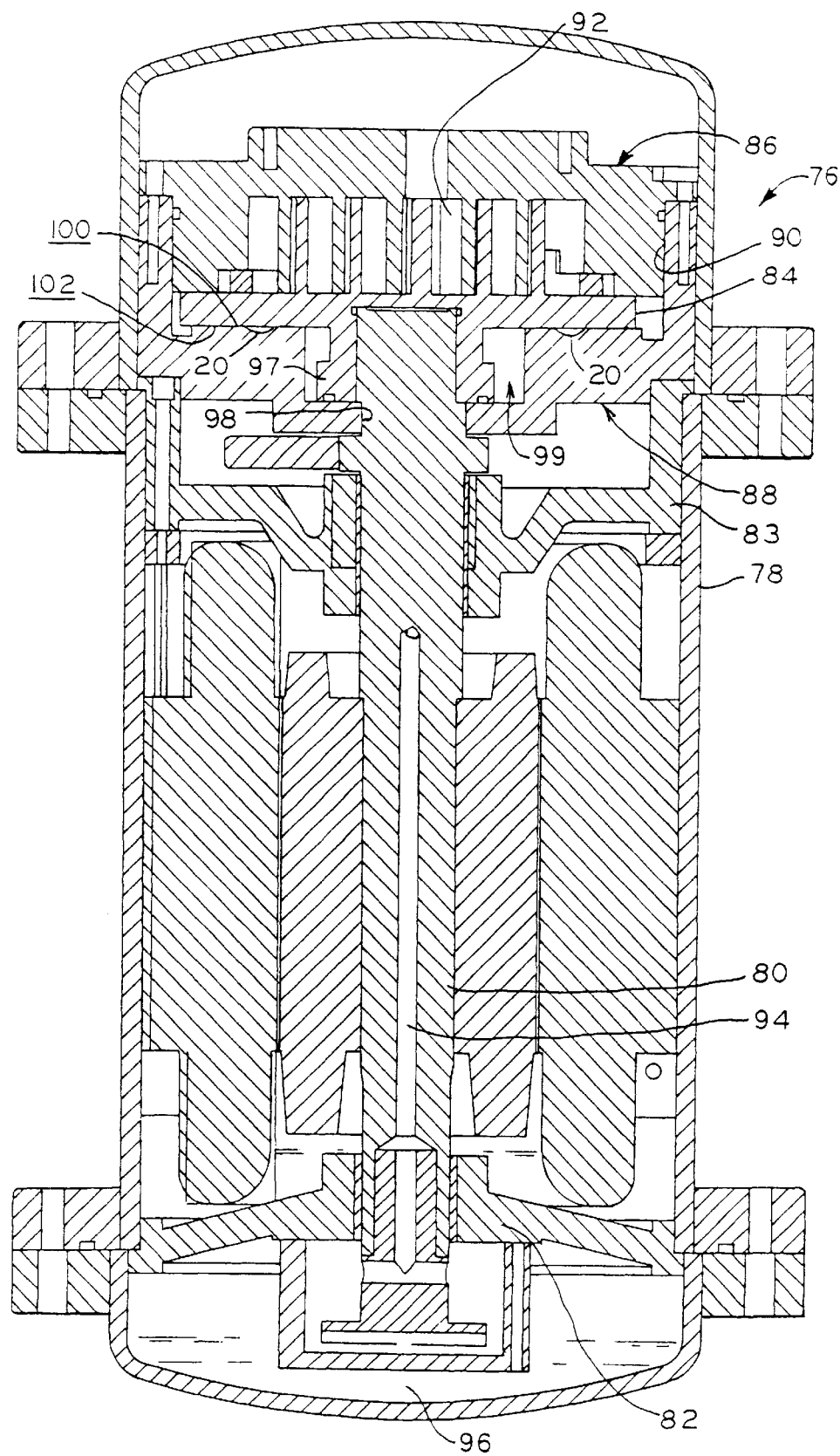
FIG. 10 is a longitudinal sectional view of an embodiment of a scroll compressor in accordance with the present invention.

Referring now to FIG. 10, there is shown scroll compressor 76 into which dimples 20 have been incorporated for supporting a thrust load. The general concept of a scroll compressor is disclosed, for example, in U.S. Pat. Nos. 4,875,838 to Richardson, Jr., 6,139,294 to Haller, 6,139,295 to Utter et al., 6,146,118 to Haller et al., and 6,196,814 to Cooksey et al., the disclosures of which are expressly incorporated herein by reference. Scroll compressor 76 includes housing 78 and crankshaft 80 which is rotatably mounted in bearings 82 and 83. Orbiting scroll member 84 is mounted on an eccentric located at one end of shaft 80 and is provided with an involute wrap operatively engaged with the wrap of fixed scroll member 86 as shown, compression spaces being defined between the scroll members. Orbiting scroll member 84 is slidably disposed on, and held in axial compliance with fixed scroll member 86 by, frame 88, which is shown in greater detail in FIGS. 11 and 12. Frame 88 has cavity 90 into which fixed scroll member 86 is fitted, cavity 90 partially defined by annular surface 100, in which a pair of concentric annular arrays of dimples 20 are provided (FIG. 12). Underside surface 102 of frame 88 interfaces surface 100. Oil is provided between surfaces 100 and 102 in any suitable way. For example, with reference to FIG. 11, an arrangement of oil delivery channels 92 may be provided in frame 88 which delivers oil pumped therethrough to surface 100 and/or to one or more of dimples 20. Alternatively, oil may be delivered upward from oil sump 96 through bore 94 in crankshaft 80 by means of an oil pump provided at the end of the crankshaft and immersed in sump 96 (FIG. 10), and/or under the influence of centrifugal force by means of bore 94 being disposed at an angle relative to the axis of rotation of the shaft, in the well known manner. Oil may then be delivered from bore 94 into chamber 99 defined between frame 88, the exterior surface of orbiting scroll member hub 97, and surface 100 of the scroll member. The oil delivered to chamber 99 may be communicated to surface 100 and/or at least one dimple 20 through channels 92 (FIG. 11). The oil in chamber 99 may be under sufficient pressure to provide axial compliance between the orbiting and fixed scroll members in a manner well-known in the art. Moreover, the oil pressure spikes which separate surfaces 100 and 102 elastohydrodynamically on a film of oil may also contribute to the axial compliance of the scroll members, the oil pressure spikes counteracting the axial separation forces between the scrolls which are induced by the pressures of gases being compressed thereby.

Figure 13:
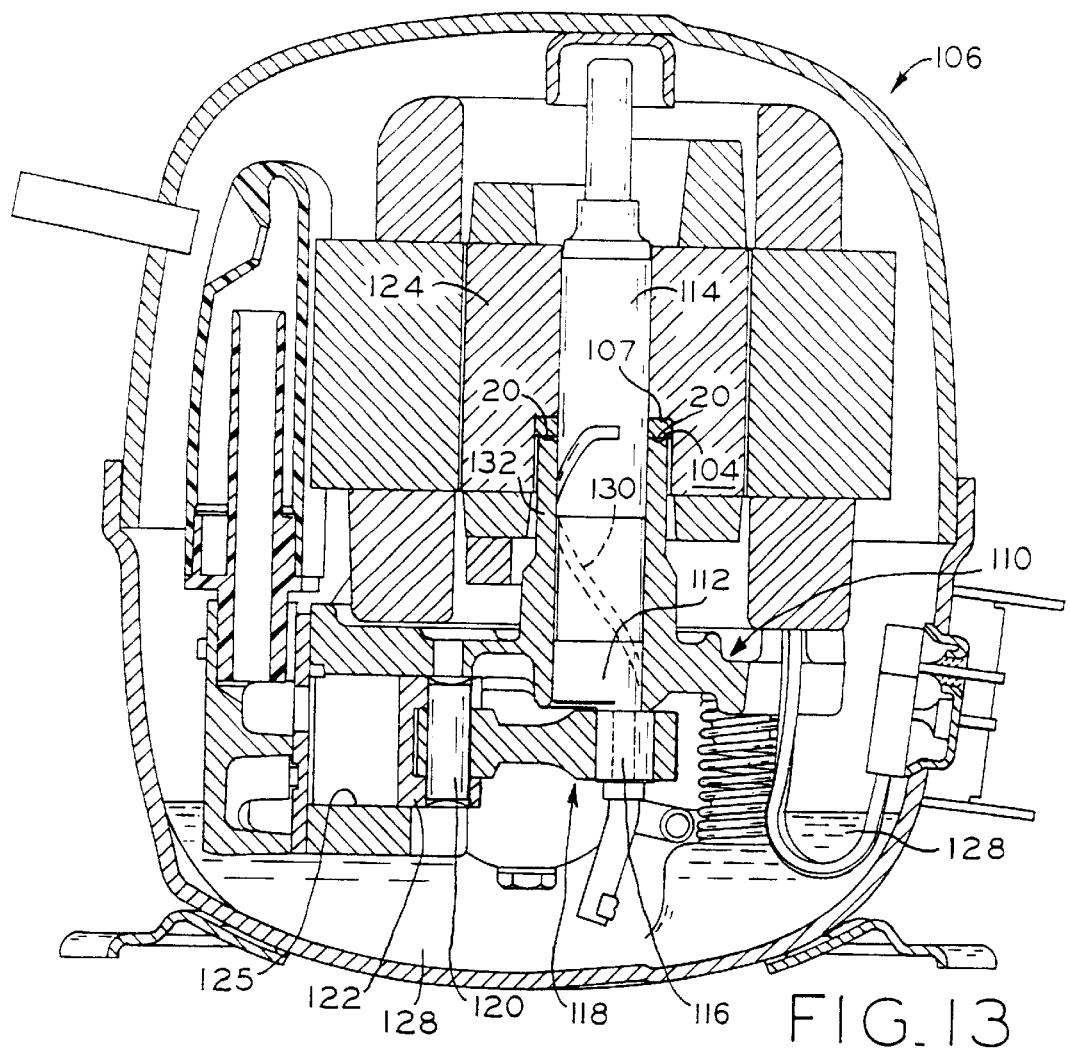
FIG. 13 is a longitudinal sectional view of a first embodiment of a reciprocating piston compressor in accordance with the present invention.
Figure 14:
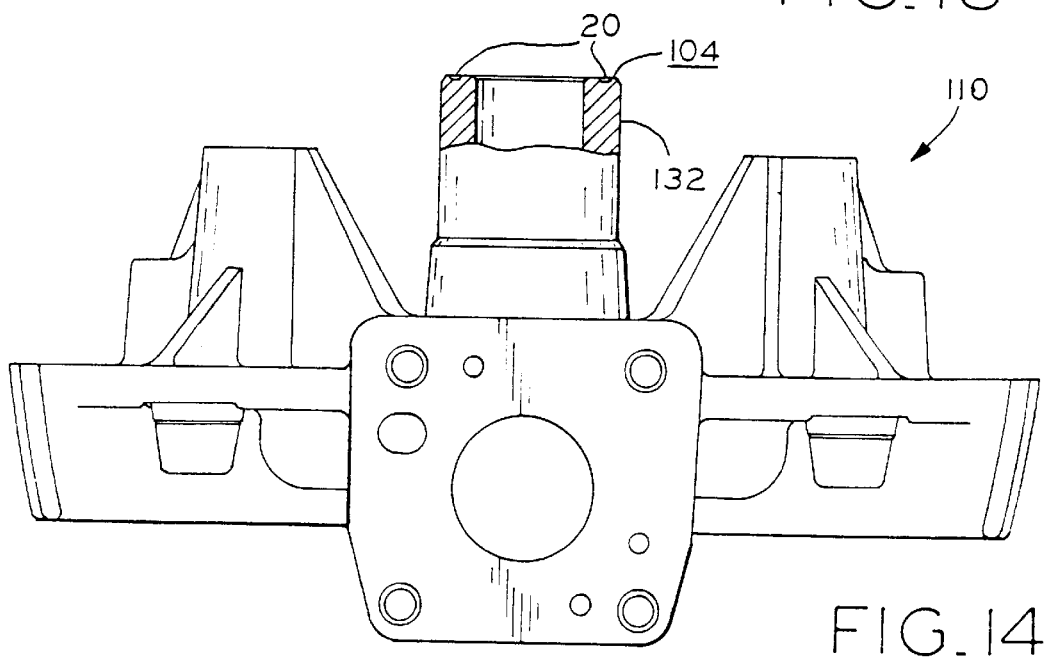
FIG. 14 is a partially sectioned side view of the crankcase of the reciprocating piston compressor of FIG. 9.
Figure 15:
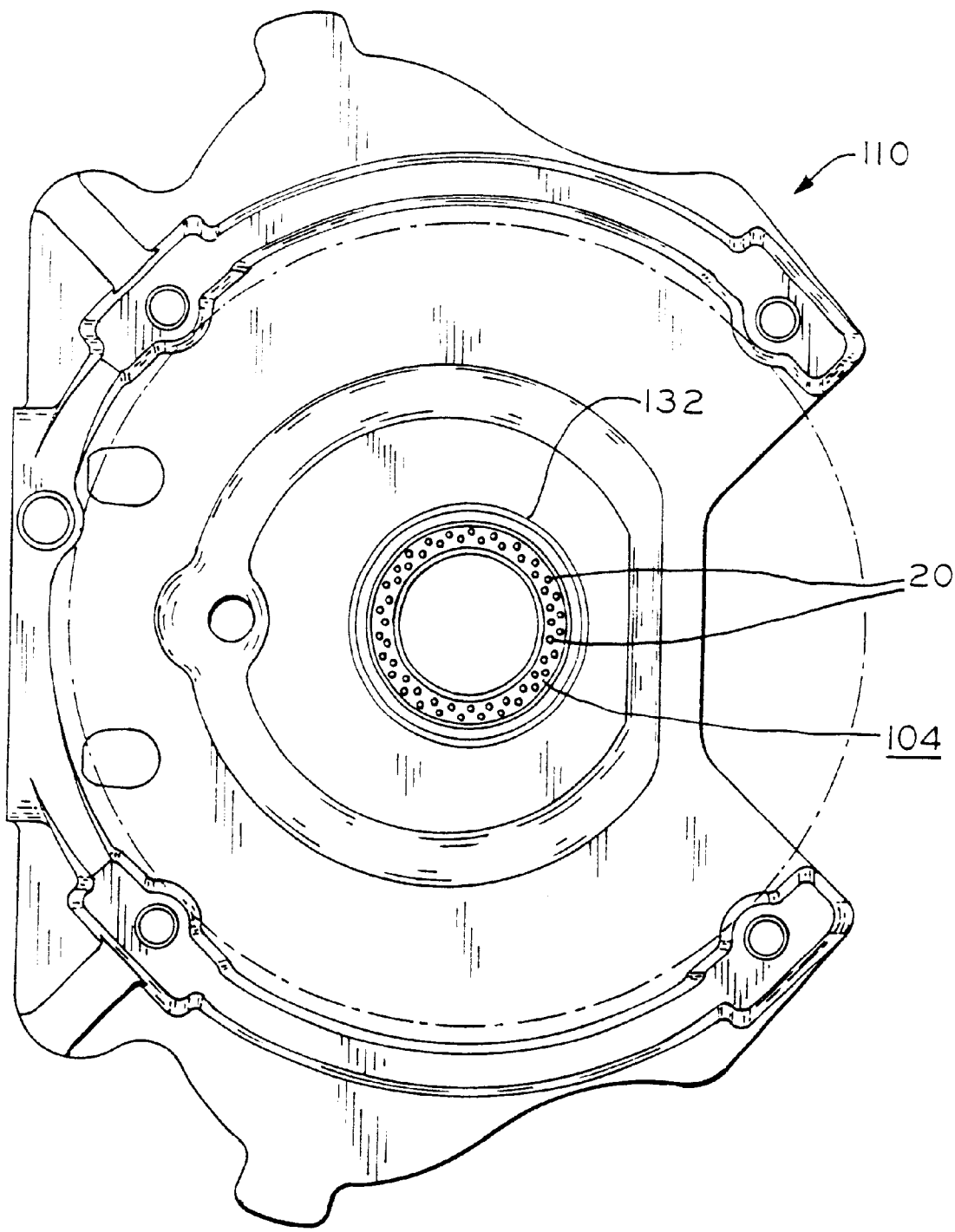
FIG. 15 is a plan view of the crankcase of FIG. 10.

Referring now to FIG. 13, there is shown a first embodiment of reciprocating piston compressor according to the present invention. The general concept of a reciprocating piston refrigeration compressor is disclosed, for example, in U.S. Pat. Nos. 5,160,247 to Kandpal and 5,554,015 to Dreiman et al., the disclosures of which are expressly incorporated herein by reference. Compressor 106 has a pair of concentric annular arrays of dimples 20 provided in thrust surface 104, which interfaces with thrust washer 107 disposed about crankshaft 114, adjacent rotor 124. Shaft 114 and rotor 124 are elastohydrodynamically supported by a film of oil provided between washer 107 and surface 104 through oil pump groove 130 provided on the exterior of shaft 114. Annular thrust surface 104 is provided on the upper end of bearing shaft 132, integrally formed on crankcase 110, as shown in FIGS. 14 and 15.

Figure 16:
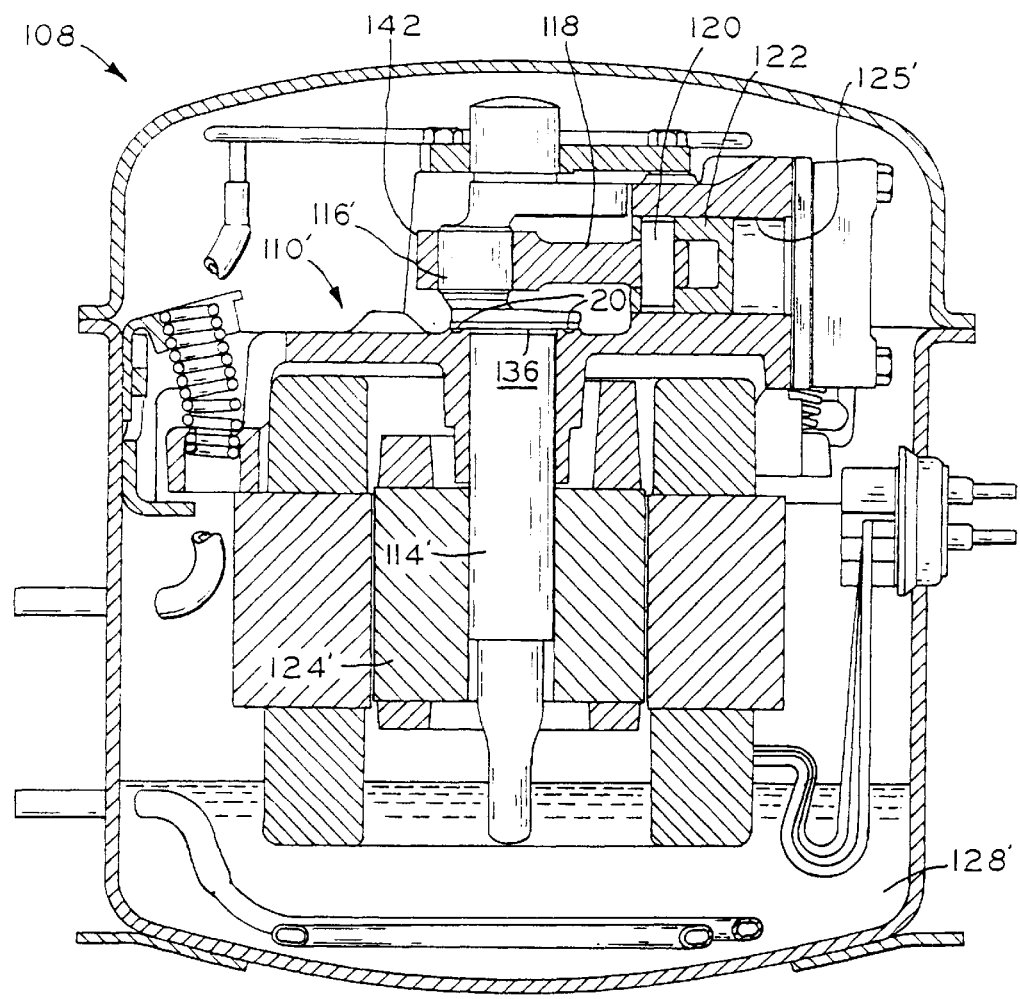
FIG. 16 is a longitudinal sectional view of a second embodiment of a reciprocating piston compressor in accordance with the present invention.

FIG. 16 illustrates a second embodiment of a reciprocating piston compressor according to the present invention. Compressor 108 also employs dimples 20 in accordance with the present invention, located on annular thrust surface 102 of bearing 150, which is integrally formed on crankcase 110' (FIG. 18). Thrust surface 102 interfaces with annular surface 136 of a flange formed on crankshaft 114' (FIG. 16). Oil is provided between surfaces 102 and 136 in any conventional way, as by means of a centrifugal oil pump having a oil conveyance bore (not shown) which extends longitudinally through shaft 114', the bore having an angle relative to the crankshaft axis of rotation and opening into the oil sump 128' at the bottom of the compressor housing, the oil delivered to the interface between surfaces 102 and 136 through a cross bore (not shown) which communicates with the oil conveyance bore. As shown in FIG. 18, surface 102 is provided with a pair of concentric annular arrays of dimples 20, as described above. Shaft 114' and rotor 124' are axially supported elastohydrodynamically by the pressure spikes created in the film of oil above each dimple 20 in surface 102. As noted above, a single array of dimples in surface 102 may suffice, depending on the load to be supported.

In each of compressors 106 and 108 (FIG. 13, and 16), connecting rod 118 engages eccentric crankpin 116 or 116' respectively formed on crankshaft 114 or 114'. Connecting rod 118 is attached at its opposite end to piston 122 via wrist pin 120. Each end of connecting rod 118 comprises a radial bearing. Piston 122 is received within cylinder bore 125 or 125', in which it reciprocates.

Figure 19:
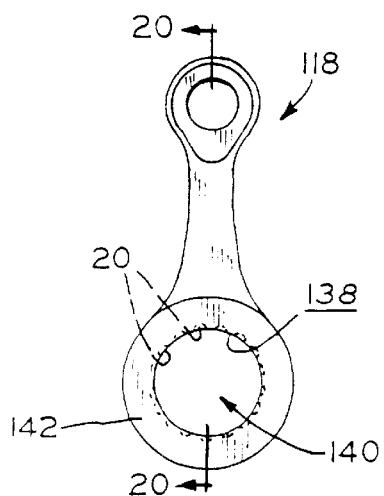
FIG. 19 is a plan view of an embodiment of a connecting rod in accordance with the present invention.
Figure 20:
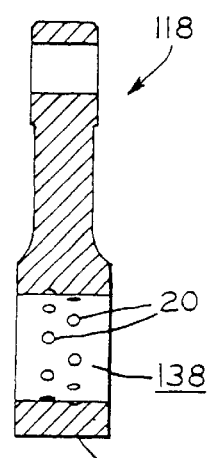
FIG. 20 is a sectional view of the connecting rod of FIG. 19 along the line 20—20.

Referring now to FIGS. 19 and 20, interior cylindrical surface 138, which defines large opening 140 at rod strap end 142 of connecting rod 118 is provided with a pair of circumferentially arranged arrays of dimples 20 (FIG. 20). Surface 138 interfaces with the cylindrical outer surface of crankpin 116 or 116', and thus a radial bearing is formed therebetween. Dimples 20 in surface 138 receive oil from respective sump 128 or 128' of compressor 106 or 108 in the way oil may usually be delivered to rod strap/crank pin interface, and oil pressure spikes are established above each dimple 20 as the outer surface of eccentric crankpin 116 or 116' and rod surface 138 slide relative to each other, thereby providing elastohydrodynamic radial support, and lubrication therebetween. Notably, connecting rod 118 could easily be used in an engine as well as in a compressor.

Figure 21:
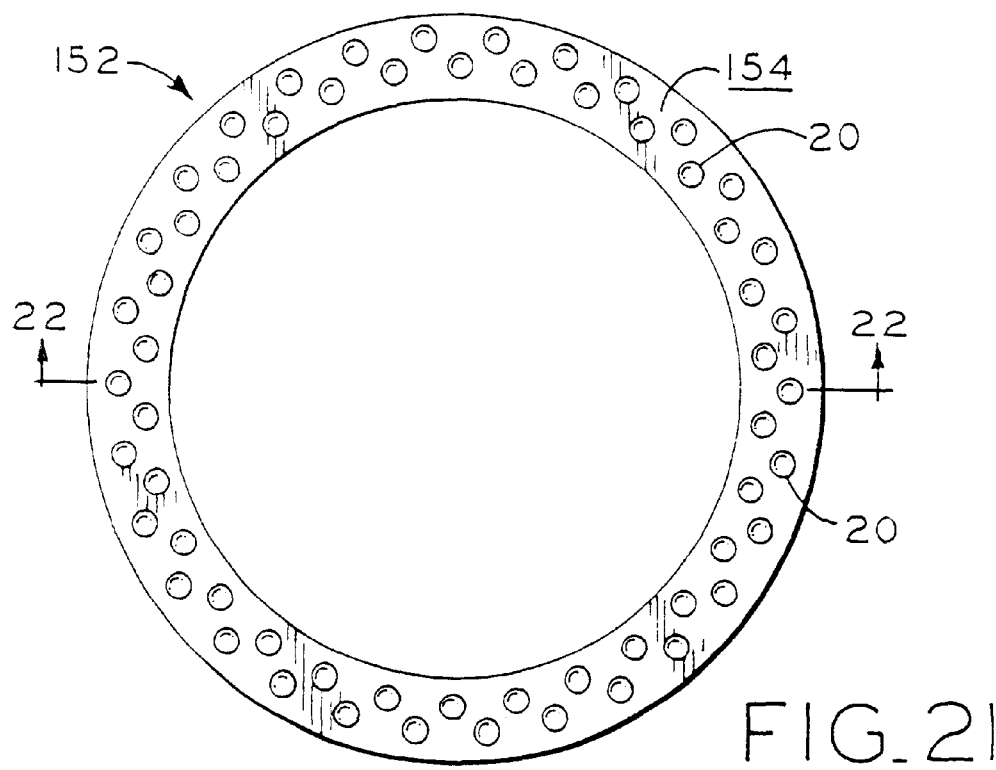
FIG. 21 is a plan view of a second embodiment of a thrust bearing in accordance with the present invention.
Figure 22:
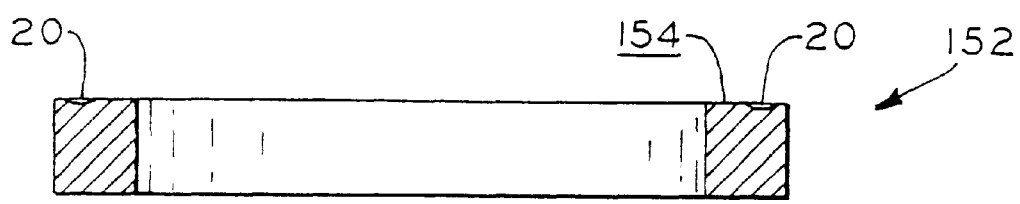
FIG. 22 is a sectional view of the thrust bearing of FIG. 21 along line 22—22.
Figure 23:
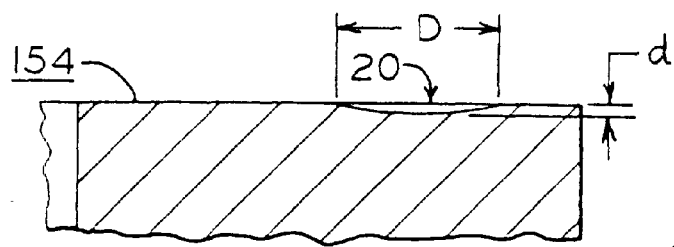
FIG. 23 is an enlarged, fragmentary sectional view of the thrust bearing of FIG. 22.

Referring now to FIGS. 21–23, there is shown a second embodiment of a thrust bearing according to the present invention. Bearing 152, which has the form of a thrust washer, has flat annular surface 154 in which is provided a pair of concentric annular arrays of dimples 20, as described above. One of dimples 20 in bearing 152 is shown in greater detail in FIG. 23, and is illustrative of all dimples 20 discussed hereinabove, in thrust bearing applications as well as in radial bearing applications. In the depicted embodiments, dimples 20 are spherically shaped. The shape of dimples 20, however, is not critical to practicing the present invention. Rather, it is the area of the dimple at the surface in which it is located (e.g., surface 154 or 138) and its depth below that surface which are important to providing the proper development of the pressure spike through the oil film which provides the desired elastohydrodynamic surface separation and lubrication. The distribution and number of dimples or arrays of dimples may be varied to accommodate different design loads, as explained above. The pattern of dimples 20 is also variable, and determined by the shape and location of the bearing interface. It is thought that any array will provide satisfactory performance which provides a total dimple area, at the surface in which dimples are located, which, in conjunction with the magnitude of the pressure spikes formed, provides a force suitable to offset the bearing load and separate the interfacing bearing surfaces.

Maximum depth d of each dimple 20 (FIG. 23) is kept very shallow, having a range between about 0.00125 and 0.0060 inches below the surface in which the dimple is provided. In the embodiments described above, maximum depth d is approximately 0.002 inches. In the embodiments described above, diameter D of each dimple 20 is approximately 0.031 inches, thereby yielding an area of approximately $7.548 \times 10^{-4}$ square inches at the surface in which the dimple is provided. This diameter may have a range between about 0.015 and 0.050 inches. These dimensions are recommended for the rotating devices discussed above, but may vary slightly depending on the relative speed of the interfacing bearing surfaces, the type of the lubricant, and its normal operating temperature and pressure. In the above described compressors, for example, an oil such as Emery 2942 (POE) may be used, and may have normal operating temperatures and pressures which range from between 180 and 280 degrees Fahrenheit, and between 78 and 645 psig. In the above described embodiments, each dimple 20 is expected to produce a pressure spike of approximately 25 psig. Thus, based on the above-cited area of $7.548 \times 10^{-4}$ square inches, each dimple 20 is expected to yield a thrust or radial force of approximately 0.1 pounds.

While this invention has been described as having a exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A rotating type machine, comprising:
   a first moving member having a first surface; and
   a second member having a second surface slidably interfacing with said first surface, said first and second surfaces having relative movement therebetween, one of said first and second members being supported by the other of said first and second members through the interface of their respective first and second surfaces, at least one of said first and second surfaces provided with at least one recess therein, a liquid lubricant being provided between said first and second surfaces, the lubricant received in said recess;
   wherein, relative to the said surface in which said recess is provided, said recess has a maximum depth which ranges between about 0.00125 and 0.0060 inches, and a surface area which ranges between about $1.767 \times 10^{-4}$ and $1.963 \times 10^{-3}$ square inches, whereby, during operation of said machine, a pressure spike is created in the lubricant above said recess and said first and second surfaces are hydrodynamically separated from each other by said pressure spike.

2. The machine in claim 1, wherein said first member is a rotating member.

3. The machine in claim 1, wherein several recesses are positioned in one or more circular patterns on one or more of said interfacing surfaces.

4. The machine in claim 1, wherein said recess is substantially spherical having a surface diameter which ranges between 0.015 and 0.050 inches.

5. The machine in claim 1, wherein said machine is a rotary compressor comprising an outboard bearing having a bearing surface, and one of said interfacing surfaces is on said bearing surface of an outboard bearing of a rotary compressor.

6. The machine in claim 1, wherein said machine is a rotary compressor comprising thrust bearing having a bearing surface, and one of said interfacing surfaces is on said bearing surface.

7. The machine in claim 1, wherein said machine is a scroll compressor comprising a substantially cylindrical roller piston having opposite ends, and at least one of said interfacing surfaces is located on at least one of said ends.

8. The machine in claim 1, wherein said machine is a scroll compressor comprising a frame, said frame having a bearing surface, and one of said interfacing surfaces is on said bearing surface.

9. The machine in claim 1, wherein said machine is a reciprocating piston compressor comprising a crankcase having an integral bearing surface, and one of said interfacing surfaces is on said bearing surface.

10. The machine in claim 1, wherein said machine is a reciprocating piston compressor comprising a crankcase having a bearing surface, and one of said interfacing surfaces is on said bearing surface.

11. The machine in claim 1, wherein said machine is a reciprocating piston compressor comprising a connecting rod having a strap, and one of said interfacing surfaces is on said rod strap.

12. The machine in claim 1, wherein one or more of said interfacing surfaces is continuously provided with oil.

13. The machine in claim 1, wherein said machine is a rotary compressor having a vane slot, and said first member is a reciprocating vane disposed in said slot, said first surface is one of two opposite planar surfaces of said vane, and said second surface partially forms said vane slot.

14. The machine in claim 12, wherein each of said two opposite planar vane surfaces is provided with at least one said recess, each said planar vane surface interfacing a surface which partially defines said slot.

15. The machine in claim 13, wherein said vane has opposite axial ends, and said opposite planar vane surfaces have their respective said at least one recess located near said opposite axial ends.

16. The machine in claim 14, wherein said rotary compressor comprises a roller in sliding contact with one of said axial vane ends, and said vane is subjected to a moment induced by said roller, said moment being counteracted by the spikes acting on said opposite sides of said vane.

17. A rotating machine, comprising:

a rotating element;

a sliding member having first and second surfaces, said rotating element engaging said sliding member and inducing a moment thereon; and a slotted member having third and fourth surfaces slidably interfacing with and moving relative to said first and second surfaces, respectively, at least one of said surfaces being provided with at least one recess therein, liquid lubricant being provided between said interfacing surfaces, the lubricant being received in said recess;

wherein, relative to the said surface in which said recess is provided, said recess has a maximum depth which ranges between about 0.00125 and 0.0060 inches, and a surface area which ranges between about $1.767 \times 10^{-4}$ and $1.963 \times 10^{-3}$ square inches, whereby, during operation of said machine, a pressure spike is created in the lubricant above said recess, said interfacing surfaces are hydrodynamically separated from each other by the pressure spike, and the moment is at least partially counteracted by the spike.

18. The machine in claim 17, wherein said machine is a rotary compressor, said rotating element is a piston, said sliding member is a reciprocating vane, said slotted member is a cylinder, said first and second surfaces form two opposite planar surfaces of said vane, and said second and third surfaces form a vane slot in said cylinder, said vane reciprocating within said slot.

19. The machine in claim 18, wherein each of said two opposite planar vane surfaces is provided with at least one said recess.

20. The machine in claim 19, wherein said vane has opposite axial ends, and said opposite planar vane surfaces each have their respective said at least one recess located near said opposite axial ends.

21. The machine in claim 20, wherein said piston is in sliding contact with one of said axial vane ends, and the moment is counteracted by the spikes acting on said opposite sides of said vane.

22. The machine in claim 17, wherein said recess is substantially spherical having a diameter at the said surface in which it is provided which ranges between 0.015 and 0.050 inches.

23. A method of elastohydrodynamically separating a pair of slidably interfacing surfaces comprising:

slidably interfacing a first member having a first surface and a second member having a second surface;

relatively moving the first and second surfaces;

collecting a quantity of lubricant in a recess located in one of the first and second surfaces;

creating a pressure spike in the lubricant above the recess and between the first and second surfaces; and elastohydrodynamically separating the first and second surfaces with the pressure spike.

\* \* \* \* \*